United States Patent
Shan et al.

(10) Patent No.: US 12,153,809 B2
(45) Date of Patent: Nov. 26, 2024

(54) FIELD-PROGRAMMABLE GATE ARRAY (FPGA) FOR IMPLEMENTING DATA TRANSFER BETWEEN DIFFERENT CONFIGURATION AND APPLICATION PROCESSES

(71) Applicant: WUXI ESIONTECH CO., LTD., Wuxi (CN)

(72) Inventors: Yueer Shan, Wuxi (CN); Yanfeng Xu, Wuxi (CN); Boyin Chen, Wuxi (CN); Zhan Jing, Wuxi (CN)

(73) Assignee: WUXI ESIONTECH CO., LTD., Wuxi (CN)

( * ) Notice: Subject to any disclaimer, the term of this patent is extended or adjusted under 35 U.S.C. 154(b) by 491 days.

(21) Appl. No.: 17/645,751

(22) Filed: Dec. 23, 2021

(65) Prior Publication Data

US 2022/0113883 A1 Apr. 14, 2022

Related U.S. Application Data

(63) Continuation of application No. PCT/CN2021/128349, filed on Nov. 3, 2021.

(30) Foreign Application Priority Data

Aug. 19, 2021 (CN) .......................... 202110954457.6

(51) Int. Cl.
*G06F 3/06* (2006.01)
(52) U.S. Cl.
CPC ............ *G06F 3/0629* (2013.01); *G06F 3/061* (2013.01); *G06F 3/0655* (2013.01); *G06F 3/0679* (2013.01)

(58) Field of Classification Search
CPC .......................... G06F 3/0629; G06F 3/0655
(Continued)

(56) References Cited

U.S. PATENT DOCUMENTS 6,009,495 A * 12/1999 DeRoo ................. G06F 9/5016
711/170
7,358,762 B1 * 4/2008 Walstrum, Jr. ... H03K 19/17758
326/38
(Continued)

FOREIGN PATENT DOCUMENTS

| CN | 111680000 A | 9/2020 |
|---|---|---|
| CN | 111813432 A | 10/2020 |
| CN | 112486585 A | 3/2021 |

*Primary Examiner* — Jack Chiang
*Assistant Examiner* — Suchin Parihar
(74) *Attorney, Agent, or Firm* — Bayramoglu Law Offices LLC

(57) ABSTRACT

A field-programmable gate array (FPGA) for implementing data transfer between different configuration and application processes includes a programmable logic resource, a configuration memory and a hardware memory. A write port and a read port of the hardware memory are respectively connected to a programmable logic resource by a wiring path, data in the hardware memory remains unchanged at an abnormal running stage of the programmable logic resource, and running data generated by a user design in a configuration and application process can be transferred to a user design in a subsequent configuration and application process by using the hardware memory for use during running. This enlarges functions of the FPGA, and meets application requirements in a plurality of different scenarios.

17 Claims, 2 Drawing Sheets

(58) Field of Classification Search
USPC .......................................................... 716/117
See application file for complete search history.

(56) References Cited

U.S. PATENT DOCUMENTS

| | | | |
|---|---|---|---|
| 8,928,351 B1* | 1/2015 | Konduru ............... | G06F 30/331 |
| | | | 326/38 |
| 11,487,445 B2* | 11/2022 | Dasu .................... | G06F 15/7871 |
| 11,784,794 B2* | 10/2023 | McElheny ......... | H03K 19/1776 |
| | | | 365/51 |
| 2004/0230771 A1* | 11/2004 | Borgatti ............. | G06F 15/7867 |
| | | | 712/34 |
| 2007/0198901 A1* | 8/2007 | Ramchandran ..... | G06F 9/30036 |
| | | | 714/781 |
| 2018/0089119 A1* | 3/2018 | Khan .................... | G06F 9/5077 |
| 2020/0257454 A1 | 8/2020 | Davis et al. | |
| 2021/0336528 A1* | 10/2021 | Zafarana ............. | H02M 3/1584 |
| 2022/0116040 A1* | 4/2022 | Shan ...................... | H03K 3/037 |
| 2023/0152970 A1* | 5/2023 | Bhagwat ............... | G06F 3/0659 |
| | | | 711/154 |
| 2024/0089024 A1* | 3/2024 | Yoshida ................ | H03M 7/008 |

\* cited by examiner

FIELD-PROGRAMMABLE GATE ARRAY (FPGA) FOR IMPLEMENTING DATA TRANSFER BETWEEN DIFFERENT CONFIGURATION AND APPLICATION PROCESSES

CROSS REFERENCE TO THE RELATED APPLICATIONS

This application is the continuation application of International Application No. PCT/CN2021/128349, filed on Nov. 3, 2021, which is based upon and claims priority to Chinese Patent Application No. 202110954457.6, filed on Aug. 19, 2021, the entire contents of which are incorporated herein by reference.

TECHNICAL FIELD

The present invention relates to the field of field-programmable gate array (FPGA) technologies, and in particular, to an FPGA for implementing data transfer between different configuration and application processes.

BACKGROUND

With the development of very large-scale integration circuits, FPGA chips have been used more widely due to excellent interface performance, rich logics and IP resources, as well as a flexible and convenient field-programmable capability.

The FPGA chip has a configurable module and a wiring resource. When being mapped to the FPGA chip, a user design may determine, by defining the configuration content (the content of a configuration bit), a function implemented by the configurable module and a wiring path selected by the wiring resource in the FPGA chip, so as to define a function implemented by the FPGA chip. An FPGA design software maps a user design input after being subjected to synthesis, layout and wiring to the FPGA chip, and then generates a bitstream file in a predetermined format according to the used configuration content of the configurable module and the wiring resource. Bitstreams can be filled in the configuration content correctly after being downloaded into a configuration memory on an FPGA chip, and the function of the FPGA chip can be defined. To maintain the correctness of a circuit of the FPGA, before the FPGA is started, the content of the configuration bit is separated from a configured module temporarily, to avoid circuit damage caused by a circuit conflict (for example, a short circuit and a large current) due to incomplete configuration during downloading. When the bitstreams are downloaded and after all bitstream data is written into the configuration bit, the bitstream data in all the configuration bits are enabled to be used to configure each configured module, so that a function of the user design can be implemented by starting and running the FPGA chip.

If the FPGA chip needs to switch to implement a function of another user design, the FPGA chip is powered down, bitstreams are re-downloaded from an off-chip to the configuration memory, and the FPGA chip is restarted to run the function of the new user design after the above process. A process in which the FPGA chip downloads the bitstream and starts running in a power-off state is considered as a configuration and application process of the FPGA chip. The same FPGA chip may be reused for a plurality of configuration and application processes. Currently, different configuration and application processes of the FPGA chip are independent from each other and data cannot be transferred between the configuration and application processes, causing a limitation on application of the FPGA chip.

SUMMARY

Technical Problem

If the FPGA chip needs to switch to implement a function of another user design, the FPGA chip is powered down, bitstreams are re-downloaded from an off-chip to the configuration memory, and the FPGA chip is restarted and enables a new function of the user design after passing through the process. A process in which the FPGA chip downloads the bitstream and starts running in a power-off state is considered as a configuration and application process of the FPGA chip. The same FPGA chip may be reused for a plurality of configuration and application processes. Currently, different configuration and application processes of the FPGA chip are independent from each other and data cannot be transferred between the configuration and application processes, causing a limitation on application of the FPGA chip.

Solutions to the Problem

Technical Solution

In view of the problem and technical requirements, the inventor proposes an FPGA for implementing data transfer between different configuration and application processes, and a technical solution of the present invention is as follows.

An FPGA for implementing data transfer between different configuration and application processes is provided, the FPGA including a programmable logic resource, a configuration memory and a hardware memory, where a write port and a read port of the hardware memory are respectively connected to the programmable logic resource by a wiring path, and data in the hardware memory remains unchanged at an abnormal running stage of the programmable logic resource;
  in a first configuration and application process of the FPGA, the FPGA downloads a first configuration bitstream corresponding to a first user design and stores the first configuration bitstream in the configuration memory, and after the first configuration bitstream is downloaded, the FPGA forms the first user design based on the first configuration bitstream in the configuration memory by using the programmable logic resource; and the first user design writes, in a predetermined format, first running data generated during running into the hardware memory for storage; and
  in a second configuration and application process of the FPGA, the FPGA downloads a second configuration bitstream corresponding to a second user design and stores the second configuration bitstream in the configuration memory, and after the second configuration bitstream is downloaded, the FPGA forms the second user design based on the second configuration bitstream in the configuration memory by using the programmable logic resource; and the second user design reads the first running data from the hardware memory in the predetermined format and runs in combination with the first running data.

A further technical solution thereof is that the abnormal running stage of the programmable logic resource includes a stage from power supply stop to repower-on of the programmable logic resource and a stage of performing a bitstream download operation and a resetting operation by the FPGA in a normal power supply process; and the resetting operation performed by the FPGA includes at least one of power-on startup resetting, global resetting, and partial resetting.

A further technical solution thereof is that the hardware memory is a memory having an independent uninterrupted power supply, or the hardware memory is a memory made by using a non-volatile memory (NVM) process; and the write port of the hardware memory keeps a default value at the abnormal running stage of the programmable logic resource.

A further technical solution thereof is that the hardware memory is a random access memory (RAM) or a first-in first-out (FIFO) memory having the independent uninterrupted power supply.

A further technical solution thereof is that when the hardware memory is the memory having the independent uninterrupted power supply, the memory is connected to an external independent uninterrupted power supply by an independent power supply pin of the FPGA, or the memory is connected to the independent uninterrupted power supply inside the FPGA by the wiring path.

A further technical solution thereof is that the programmable logic resource is connected to the write port of the hardware memory by an input buffer, the read port of the hardware memory is connected to the programmable logic resource by an output buffer, an input terminal of the input buffer is further provided with a default value supply circuit, and the default value supply circuit is powered by the independent uninterrupted power supply of the hardware memory.

A further technical solution thereof is that the default value supply circuit is a pull-up circuit or a bus holder circuit.

A further technical solution thereof is that the first user design and the second user design are different user designs, and the first configuration bitstream is different from the second configuration bitstream.

A further technical solution thereof is that the first user design and the second user design are an identical user design, and the first configuration bitstream is identical to the second configuration bitstream.

A further technical solution thereof is that the first configuration and application process and the second configuration and application process are two different running stages in a running process of the identical user design, the first running data is used for representing a running state of the first user design in the first configuration and application process, and the second user design is restored to the running state in the first configuration and application process from the second configuration and application process when running in combination with the first running data.

A further technical solution thereof is that when a running stage corresponding to the first user design is ended, the FPGA is powered down, power supplied to the programmable logic resource is stopped, and the first configuration and application process is ended.

A further technical solution thereof is that when a power-off error occurs in the FPGA during running of the first user design, power supplied to the programmable logic resource is stopped, and the first configuration and application process is ended.

A further technical solution thereof is that during running of the first user design, data is over-written into the hardware memory at a predetermined time interval to update and form the first running data.

A further technical solution thereof is that a read bit width and a write bit width of a user design for the hardware memory are set according to a control signal generated by the user design.

A further technical solution thereof is that a read bit width and a write bit width of the first user design for the hardware memory are identical to or different from a read bit width and a write bit width of the second user design for the hardware memory.

A further technical solution thereof is that the hardware memory is a memory having an error correction code (ECC) function, or the hardware memory is a memory connected to an ECC circuit.

A further technical solution thereof is that the FPGA is a multi-die structure including a plurality of dies, and the hardware memory is integrated into one die in the FPGA, or the hardware memory is an independent die.

Advantage of the Present Invention

Advantage

The present invention discloses an FPGA for implementing data transfer between different configuration and application processes. The FPGA includes a hardware memory that can keep internal data unchanged at an abnormal running stage of a programmable logic resource, and running data generated by a user design in a configuration and application process is transferred to a user design in a subsequent configuration and application process by using the hardware memory for use during running. This enlarges functions of the FPGA, and meets application requirements in a plurality of different scenarios.

Different user designs may run in different configuration and application processes of the FPGA for implementing data transfer, so that a plurality of user designs may be respectively implemented by applying an FPGA in a time-sharing manner, and data transfer between different user designs can be implemented without additional chip in addition to the FPGA.

The same user design may run in different configuration and application processes of the FPGA for implementing data transfer. On one hand, a relatively long complete running process of a user design may be performed in a segmented manner by temporarily storing an intermediate result, to reduce the pressure of FPGA running for a long time. On the other hand, when a power-off failure occurs, a task can continue to run without starting from the beginning, to improve the running reliability.

BRIEF DESCRIPTION OF THE DRAWINGS

Description of the Drawings

Figure 1:
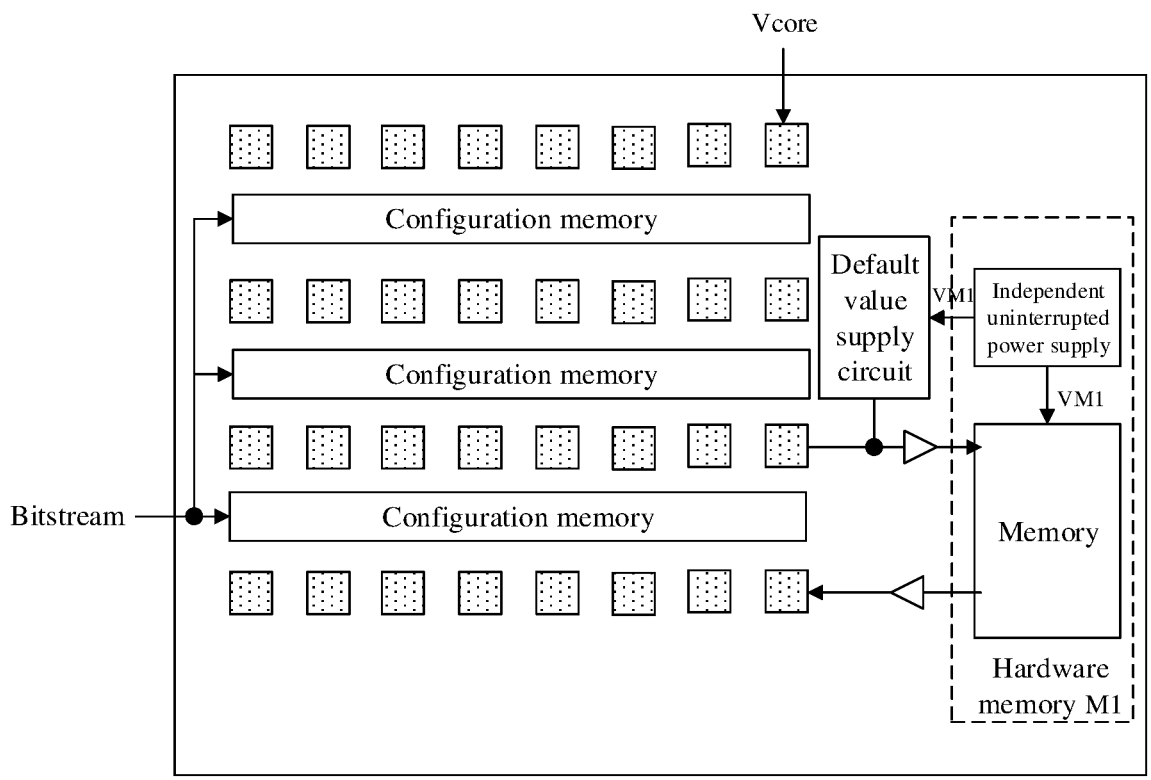

FIG. 1 is a schematic diagram of an internal structure of an FPGA according to an embodiment of the present invention.

Figure 2:
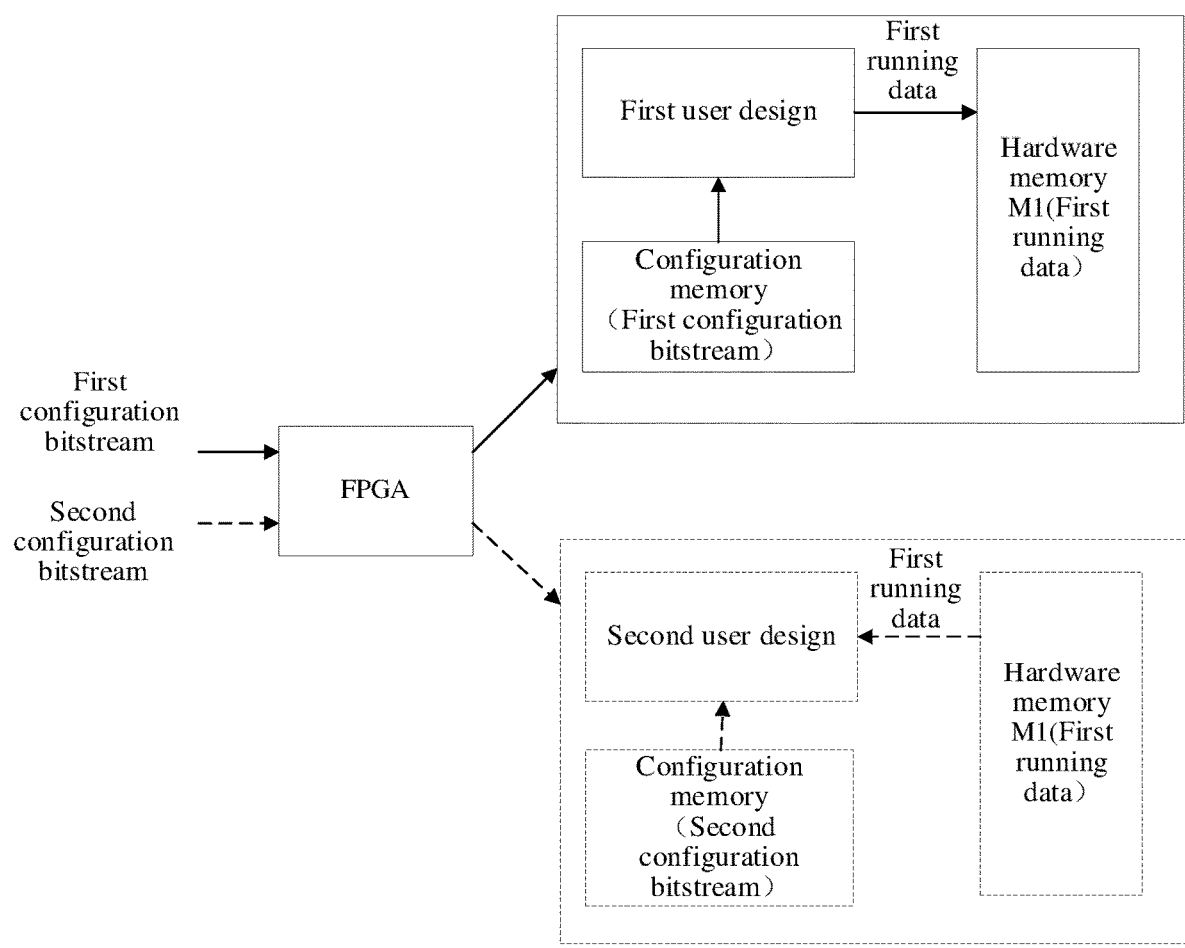

FIG. 2 is a schematic diagram in which an FPGA performs data transfer between configuration and application processes according to the present invention.

DETAILED DESCRIPTION OF THE EMBODIMENTS

Implementations of the Invention

The specific embodiments of the present invention will be further described with reference to the accompanying drawings.

The present invention discloses an FPGA for implementing data transfer between different configuration and application processes. As shown in FIG. 1, the FPGA further includes an additionally increased hardware memory M1 in addition to including a programmable logic resource and a configuration memory in a conventional FPGA chip, where the hardware memory M1 is implemented by using a fixed hardware resource in an application-specific integrated circuit (ASIC) manner rather than implemented by using the programmable logic resource in the FPGA. Diagrams with fillings in FIG. 1 represent programmable logic resources, and the programmable logic resources are arranged in the FPGA in a row-column-type structure according to a common column-based architecture. FIG. 1 is only a simple diagram and does not show all structure relationships inside a conventional FPGA.

A write port and a read port of the hardware memory M1 are respectively connected to the programmable logic resource by a wiring path. Specifically, the programmable logic resource is connected to the write port of the hardware memory M1 by an input buffer, and the read port of the hardware memory M1 is connected to the programmable logic resource by an output buffer. A conventional programmable logic resource mainly includes a wiring resource and a programmable module, and actually, the write port and the read port of the hardware memory M1 are usually connected to the wiring resource and then connected to the programmable module by the wiring resource, to implement data transmission between the programmable logic resource and the hardware memory M1.

In an embodiment, the hardware memory M1 is a common volatile memory having an independent uninterrupted power supply, where the word "independent" refers to independent power supply relative to the programmable logic resource of the FPGA. As shown in FIG. 1, the programmable logic resource is powered by a Vcore, and a memory in the hardware memory M1 is powered by VM1 provided by the independent uninterrupted power supply. When the programmable logic resource is powered off, power supplied to the hardware memory M1 is still stable and is uninterrupted, to ensure that stored content is not lost. Optionally, the hardware memory M1 is a random access memory (RAM) or a first-in first-out (FIFO) memory having the independent uninterrupted power supply. There are mainly two implementations for the independent uninterrupted power supply of the hardware memory M1: One implementation is that the independent uninterrupted power supply is an externally connected power supply of the FPGA, and the memory is connected to the external independent uninterrupted power supply by an independent power supply pin of the FPGA. The other implementation is that the independent uninterrupted power supply is packaged and integrated into the FPGA. For example, as shown in FIG. 1, the memory is connected to the independent uninterrupted power supply inside the FPGA by a wiring path.

In another embodiment, the hardware memory M1 is a memory made by using a non-volatile memory (NVM) process, for example, the memory is implemented by using a common flash process. The hardware memory M1 and the programmable logic resource may use the same power supply, so that even through the power supply is disconnected, content stored in the hardware memory M1 is not lost.

No matter what structure the hardware memory adopts, the write port of the hardware memory M1 keeps a default value at an abnormal running stage of the programmable logic resource. A method provided in an embodiment is that a default value supply circuit is disposed at the write port of the hardware memory M1, where the default value supply circuit is specifically disposed at an input terminal of the input buffer, and the default value supply circuit is a pull-up circuit or a but holder circuit. The default value supply circuit is powered by the independent uninterrupted power supply. When the hardware memory M1 has the independent uninterrupted power supply, the default value supply circuit is powered by the independent uninterrupted power supply of the hardware memory; and when the hardware memory M1 has no independent uninterrupted power supply, the default value supply circuit is powered by an independent uninterrupted power supply alone. There are also two implementations of built-in and external connection, which are not described herein in detail. Because the default value supply circuit also needs to use the independent uninterrupted power supply, a more common implementation of the hardware memory M1 is that a common volatile memory is combined with the independent uninterrupted power supply. Due to the existence of the default value supply circuit, an input signal provided by the programmable logic resource is input to the hardware memory M1 as long as being added with a default value, so that an input of the hardware memory M1 may keep the default value at the abnormal running stage of the programmable logic resource, and the input is not affected.

Data in the hardware memory M1 may remain unchanged when the programmable logic resource is powered off, and the write port of the hardware memory M1 keeps the default value at the abnormal running stage of the programmable logic resource. Therefore, the data in the hardware memory M1 can remain unchanged at the abnormal running stage of the programmable logic resource. The abnormal running stage of the programmable logic resource includes a stage from power supply stop to repower-on of the programmable logic resource and a stage of performing a bitstream download operation and a resetting operation by the FPGA in a normal power supply process. The power supply stop of the programmable logic resource includes a power supply stop caused by normal power-down and a power supply stop caused by a power-off failure. The resetting operation performed by the FPGA includes at least one of power-on startup resetting, global resetting, and partial resetting.

In the present invention, when the FPGA works, in a first configuration and application process of the FPGA, the FPGA downloads a first configuration bitstream corresponding to a first user design and stores the first configuration bitstream in a configuration memory, as shown in a solid line part in FIG. 2. After the first configuration bitstream is downloaded, the FPGA performs the power-on startup resetting and forms the first user design based on the first configuration bitstream in the configuration memory by using the programmable logic resource. The first user design writes, in a predetermined format, first running data generated during running into the hardware memory M1 for storage, where the first running data is all or a part of data generated during running of the first user design, and is usually a relatively important part of data in consideration of a limited storage space, and the first running data includes pre-defined execution result data that needs to be transmitted to a subsequent configuration and application process and/or data used for representing a running state of a user design in a configuration and application process.

In the first configuration and application process, the first user design may write data that needs to be stored only once, i.e., when the first configuration and application process is ended, corresponding data is written into the hardware memory M1 to form the first running data. Alternatively, the first user design performs over-writing for a plurality of times, i.e., during running of the first user design, corresponding data is over-written into the hardware memory M1 at a predetermined time interval to update and form the first running data. It can not only ensure that the first running data finally stored in the hardware memory M1 is the latest data, but also relatively high reliability is additionally achieved, and a problem that the data cannot be written at the end of the first configuration and application process caused by a sudden error during running of the first user design can be avoided.

When the first configuration and application process of the FPGA is ended, in another second configuration and application process of the FPGA, the FPGA downloads a second configuration bitstream corresponding to a second user design and stores the second configuration bitstream in the configuration memory, as shown in a dashed line part in FIG. 2. After the second configuration bitstream is downloaded, the FPGA performs the power-on startup resetting and forms the second user design based on the second configuration bitstream in the configuration memory by using the programmable logic resource. Because the data in the hardware memory M1 can remain unchanged at the abnormal running stage of the programmable logic resource, the hardware memory M1 still stores the first running data written by the first user design in this case. The second user design reads the first running data from the hardware memory in the predetermined format and runs in combination with the first running data, to implement data transfer between two configuration and application processes.

The first user design writes the first running data into the hardware memory M1 in the predetermined format, the second user design reads the first running data in the same format for use, and read bit widths and write bit widths of the two user designs are identical or different. A read bit width and a write bit width of a user design for the hardware memory M1 are set according to a control signal generated by the user design rather than determined by a configuration bitstream.

There are mainly two application scenarios of data transfer between two configuration and application processes implemented by the FPGA in the present invention.

1. The first user design and the second user design are different user designs, and the first configuration bitstream is different from the second configuration bitstream. In this scenario, a relatively common condition is that the first user design ends the first configuration and application process after running on the FPGA, and the second user design ends the second configuration and application process after running on the FPGA, i.e., one configuration and application process is a complete running process of a corresponding user design. However, in some special cases, the first user design can end the first configuration and application process during running on the FPGA, and similarly, the second user design can end the second configuration and application process during running on the FPGA, i.e., one configuration application process is a part of running process of a corresponding user design.

In either case, in the application scenario, a plurality of user design may be respectively implemented by applying an FPGA in a time-sharing manner, and data transfer between different user designs can be implemented without additional chip in addition to the FPGA.

2. the first user design and the second user design are an identical user design, and the first configuration bitstream is identical to the second configuration bitstream. Similarly, in the application scenario, similar to the foregoing application scenario, one configuration and application process may be a complete running process or a part of running process of a corresponding user design. However, in the application scenario, it is more common that one configuration and application process is a part of running process of a corresponding user design, i.e., the first configuration and application process and the second configuration and application process are two different running stages in a running process of the identical user design. After one user design runs on the FPGA for a running stage and is ended, the first configuration and application process is formed, and then the user design may run on the FPGA for a subsequent running stage to form the second configuration and application process. Therefore, in this case, the first running data is used for representing a running state of the first user design in the first configuration and application process, and the second user design is restored to the running state in the first configuration and application process from the second configuration application process when running in combination with the first running data, i.e., the second user design continues to run from the running state in the first configuration and application process.

In an embodiment, a plurality of relay points are preset for a complete running process of a user design, and the complete running process is segmented by using the relay points to form a plurality of running stages. The FPGA is powered down when one running stage is ended, power supplied to the programmable logic resource is stopped, and a corresponding configuration and application process is ended. After stopping operation for a period of rest, the FPGA is powered on again and enters a configuration and application process corresponding to a next running stage, and runs from a running state in the previous configuration and application process. That is, when a running stage corresponding to the first user design is ended, the FPGA is powered down, power supplied to the programmable logic resource is stopped, and the first configuration and application process is ended. The second configuration application process is performed continuously from the running state in the first configuration and application process. This feature causes the FPGA to be very suitable for implementing a scenario in which a user design has a relatively long complete running process. A running task may be performed in a segmented manner by temporarily storing an intermediate result, to reduce the pressure of FPGA running for a long time.

In another embodiment, a complete running process of a user design is divided into a plurality of running stages due to a power-off error. If a power-off error occurs when the FPGA runs the user design, power supplied to the programmable logic resource is stopped, and a current configuration and application process is ended to form a running stage. The FPGA is re-powered on and downloads the same configuration bitstream again, and the FPGA continues to run from a running state in the previous configuration and application process. That is, when a power-off error occurs in the FPGA during running of the first user design, power supplied to the programmable logic resource is stopped, and the first configuration and application process is ended. The second configuration and application process is performed continuously from the running state in the first configuration and application process. This feature causes the FPGA to be not affected by an intermediate power-off failure during running of a user design, and when a power-off failure occurs, a task can continue to run without starting from the beginning, to improve the running reliability.

In addition, optionally, in an embodiment, the hardware memory M1 is a memory having an ECC function or the hardware memory M1 is a memory connected to an ECC circuit, so that the hardware memory M1 further performs ECC check and error correction on transferred data in addition to implementing a function of data transfer between different configuration and application processes, to ensure the accuracy of the transferred data, thereby further improving the running reliability of the FPGA.

The FPGA provided in the foregoing embodiments is a single-die FPGA or a multi-die FPGA. When the FPGA is a multi-die structure including a plurality of dies, the hardware memory M1 is integrated into one die in the FPGA, or the hardware memory M1 is an independent die inside the multi-die FPGA and is connected to other FPGA dies.

In addition, it should be noted that the first configuration and application process and the second configuration and application process are respectively any two configuration and application processes of the FPGA. A common case is that the two configuration and application processes are two continuous configuration and application processes, i.e., after the FPGA ends the first configuration and application process, a next executed configuration and application process is the second configuration and application process. However, the two configuration and application processes may alternatively be discontinuous configuration and application processes. For example, after the FPGA ends the first configuration and application process, another configuration and application process such as a third configuration and application process is continuously performed, but the first running data in the hardware memory is not modified in the third configuration and application process. After the third configuration and application process is ended, the first running data is still stored in the hardware memory. In this case, when performing the second configuration and application process, the FPGA can still read the first running data from the hardware memory, to implement the data transfer process. In the third configuration and application process, a corresponding user design may only read or neither write nor read the first running data in the hardware memory, which can ensure that the first running data in the hardware memory is not modified. Therefore, not every user design in each configuration and application process will exchange data in the hardware memory. When exchanging data in the hardware memory, the user design may perform read only, or perform write only, or perform both read and write.

In actuality, the FPGA may have more configuration and application processes, and a process of implementing data transfer between the first configuration and application process and the second configuration and application process described in the foregoing embodiments may be applied to any two configuration and application processes. One configuration and application process is used as the second configuration and application process in a scenario, and running data stored in a previous configuration and application process is read from the hardware memory, and in another scenario, one configuration and application process is used as the first configuration and application process, and running data generated in the first configuration and application process is transmitted to a subsequent configuration and application process, to form a plurality of data transfer processes. For example, a user design A writes running data A into the hardware memory M1 in a configuration and application process A, a user design B reads the running data A from the hardware memory M1 in a configuration and application process B and runs, and generates running data B and writes the running data B into the hardware memory M1, a user design C reads the running data B from the hardware memory M1 in a configuration and application process C and runs, and generates running data C and writes the running data C into the hardware memory M1, and so on. When the configuration and application processes correspond to the same user design, and the user design generates new running data after correcting the read running data in each configuration and application process, the FPGA can implement a common machine learning application through the configuration and application processes for transferring data with each other.

In addition, the FPGA may also be compatible with the application of conventional FPGA chips, i.e., the hardware memory M1 is used as a common memory for storing data rather than implementing data transfer between different configuration and application processes.

What is claimed is:

1. A field-programmable gate array (FPGA) for implementing data transfer between different configuration and application processes, comprising a programmable logic resource, a configuration memory and a hardware memory, wherein a write port and a read port of the hardware memory are respectively connected to the programmable logic resource by a wiring path, and data in the hardware memory remains unchanged at an abnormal running stage of the programmable logic resource;

wherein in a first configuration and application process of the FPGA, the FPGA downloads a first configuration bitstream corresponding to a first user design and stores the first configuration bitstream in the configuration memory, and after the first configuration bitstream is downloaded, the FPGA forms the first user design based on the first configuration bitstream in the configuration memory by using the programmable logic resource; and the first user design writes, in a predetermined format, first running data generated during running into the hardware memory for storage; and in a second configuration and application process of the FPGA, the FPGA downloads a second configuration bitstream corresponding to a second user design and stores the second configuration bitstream in the configuration memory, and after the second configuration bitstream is downloaded, the FPGA forms the second user design based on the second configuration bitstream in the configuration memory by using the programmable logic resource; and the second user design reads the first running data from the hardware memory in the predetermined format and runs by applying the first running data in the second design.

2. The FPGA according to claim 1, wherein the abnormal running stage of the programmable logic resource comprises a stage from power supply stop to repower-on of the programmable logic resource and a stage of performing a bitstream download operation and a resetting operation by the FPGA in a normal power supply process; and the resetting operation performed by the FPGA comprises at least one selected from the group consisting of power-on startup resetting, global resetting, and partial resetting.

3. The FPGA according to claim 2, wherein the hardware memory is a memory having an independent uninterrupted power supply, or the hardware memory is a memory made by using a non-volatile memory (NVM) process; and the write port of the hardware memory keeps a default value at the abnormal running stage of the programmable logic resource.

4. The FPGA according to claim 3, wherein the hardware memory is a random access memory (RAM) having the independent uninterrupted power supply or a first-in first-out (FIFO) memory having the independent uninterrupted power supply.

5. The FPGA according to claim 3, wherein when the hardware memory is the memory having the independent uninterrupted power supply, the memory is connected to an external independent uninterrupted power supply by an independent power supply pin of the FPGA, or the memory is connected to the independent uninterrupted power supply inside the FPGA by the wiring path.

6. The FPGA according to claim 5, wherein the programmable logic resource is connected to the write port of the hardware memory by an input buffer, the read port of the hardware memory is connected to the programmable logic resource by an output buffer, an input terminal of the input buffer is further provided with a default value supply circuit, and the default value supply circuit is powered by the independent uninterrupted power supply of the hardware memory.

7. The FPGA according to claim 6, wherein the default value supply circuit is a pull-up circuit or a bus holder circuit.

8. The FPGA according to claim 1, wherein the first user design and the second user design are different user designs, and the first configuration bitstream is different from the second configuration bitstream.

9. The FPGA according to claim 1, wherein the first user design and the second user design are an identical user design, and the first configuration bitstream is identical to the second configuration bitstream.

10. The FPGA according to claim 9, wherein the first configuration and application process and the second configuration and application process are two different running stages in a running process of the identical user design, wherein
the first running data is used for representing a running state of the first user design in the first configuration and application process, and
the second user design is restored to the running state in the first configuration and application process from the second configuration and application process when the second user design runs in combination with the first running data.

11. The FPGA according to claim 10, wherein when a running stage corresponding to the first user design is ended, the FPGA is powered down, power supplied to the programmable logic resource is stopped, and the first configuration and application process is ended.

12. The FPGA according to claim 10, wherein when a power-off error occurs in the FPGA during running of the first user design, power supplied to the programmable logic resource is stopped, and the first configuration and application process is ended.

13. The FPGA according to claim 1, wherein during running of the first user design, data is over-written into the hardware memory at a predetermined time interval to update and form the first running data.

14. The FPGA according to claim 1, wherein a read bit width and a write bit width of a user design for the hardware memory are set according to a control signal generated by the user design.

15. The FPGA according to claim 1, wherein a read bit width and a write bit width of the first user design for the hardware memory are identical to or different from a read bit width and a write bit width of the second user design for the hardware memory.

16. The FPGA according to claim 1, wherein the hardware memory is a memory having an error correction code (ECC) function, or the hardware memory is a memory connected to an ECC circuit.

17. The FPGA according to claim 1, wherein the FPGA is a multi-die structure comprising a plurality of dies, and the hardware memory is integrated into one of the plurality of dies in the FPGA, or the hardware memory is an independent die.

* * * * *